(12) United States Patent
Wismer et al.

(10) Patent No.: US 11,365,139 B2
(45) Date of Patent: Jun. 21, 2022

(54) REMOVAL OF SELENOCYANATE FROM REFINERY SOUR WATER STRIPPER WASTEWATER

(71) Applicants: Evoqua Water Technologies LLC, Warrendale, PA (US); The Texas A&M University System, College Station, TX (US)

(72) Inventors: Michael W. Wismer, Lino Lakes, MN (US); Samuel A. Mason, Warrendale, PA (US); Yongheng Huang, College Station, TX (US)

(73) Assignees: Evoqua Water Technologies LLC, Warrendale, PA (US); The Texas A&M University System, College Station, TX (US)

( * ) Notice: Subject to any disclaimer, the term of this patent is extended or adjusted under 35 U.S.C. 154(b) by 59 days.

(21) Appl. No.: 16/691,760

(22) Filed: Nov. 22, 2019

(65) Prior Publication Data
US 2020/0087179 A1 Mar. 19, 2020

Related U.S. Application Data (62) Division of application No. 15/305,603, filed as application No. PCT/US2015/026790 on Apr. 22, 2014, now abandoned.

(Continued)

(51) Int. Cl.
*B01J 20/02* (2006.01)
*B01J 20/06* (2006.01)
(Continued)

(52) U.S. Cl.
CPC .............. *C02F 1/705* (2013.01); *B01J 20/02* (2013.01); *B01J 20/06* (2013.01);
(Continued)

(58) Field of Classification Search
CPC .. C02F 1/705; C02F 1/288; C02F 1/52; C02F 1/685; C02F 1/74; C02F 1/281; C02F 2101/106; C02F 2101/20; C02F 2103/06; C02F 2103/10; C02F 1/66; C02F 101/106; C02F 101/20; C02F 2103/18; C02F 2103/365; B01D 15/02; B01J 20/02; B01J 20/0229; B01J 20/32; B01J 20/3204; B01J 20/3234; B01J 20/3236; B01J 20/3293; B01J 20/06; B01J 20/28009
See application file for complete search history.

(56) References Cited

U.S. PATENT DOCUMENTS

2007/0119785 A1* 5/2007 Englehardt .............. C02F 1/74
 210/749
2011/0174743 A1 7/2011 Huang
2012/0273431 A1 11/2012 Huang

OTHER PUBLICATIONS

Emerson, "Sour water stripper," Application Data Sheet ADS 2900-10/rev. C, Feb. 2008, 2 pages. (Year: 2008).*

(Continued)

*Primary Examiner* — Benjamin L Lebron
(74) *Attorney, Agent, or Firm* — Christensen O'Connor Johnson Kindness PLLC (57) ABSTRACT

Systems and methods for removing heavy metals such as selenium from wastewater with zero valent iron media. Air may be introduced directly into a reaction zone of a fluidized bed reactor filled with the media to catalyze treatment.

13 Claims, 7 Drawing Sheets

Related U.S. Application Data (60) Provisional application No. 61/982,617, filed on Apr. 22, 2014.

(51) Int. Cl.

| | | |
|---|---|---|
| *B01J 20/32* | (2006.01) |
| *C02F 1/28* | (2006.01) |
| *C02F 1/52* | (2006.01) |
| *C02F 1/66* | (2006.01) |
| *C02F 1/68* | (2006.01) |
| *C02F 1/70* | (2006.01) |
| *C02F 1/74* | (2006.01) |
| *B01J 20/28* | (2006.01) |
| *C02F 101/10* | (2006.01) |
| *C02F 103/18* | (2006.01) |
| *C02F 103/36* | (2006.01) |
| *C02F 101/20* | (2006.01) |
| *C02F 103/06* | (2006.01) |
| *C02F 103/10* | (2006.01) |

(52) U.S. Cl.
CPC ..... *B01J 20/28009* (2013.01); *B01J 20/3204* (2013.01); *B01J 20/3236* (2013.01); *B01J 20/3293* (2013.01); *C02F 1/288* (2013.01); *C02F 1/52* (2013.01); *C02F 1/66* (2013.01); *C02F 1/685* (2013.01); *C02F 1/74* (2013.01); *C02F 1/281* (2013.01); *C02F 2101/106* (2013.01); *C02F 2101/20* (2013.01); *C02F 2103/06* (2013.01); *C02F 2103/10* (2013.01); *C02F 2103/18* (2013.01); *C02F 2103/365* (2013.01)

(56) References Cited

OTHER PUBLICATIONS

International Search Report and Written Opinion dated Aug. 28, 2015, issued in corresponding International Application No. PTC/US/2015/026790, filed Apr. 21, 2015, 10 pages.

Office Action dated Apr. 6, 2021, issued in corresponding Canadian Application No. 2,945,980, 4 pages.

Office Action dated Nov. 23, 2021, issued in corresponding Canadian Application No. 2,945,980, 4 pages.

* cited by examiner

REMOVAL OF SELENOCYANATE FROM REFINERY SOUR WATER STRIPPER WASTEWATER

CROSS-REFERENCE TO RELATED APPLICATION

This application is a divisional of U.S. application Ser. No. 15/305,603 filed Oct. 20, 2016, the contents of which are incorporated by reference herein in their entirety.

FIELD OF THE DISCLOSURE

Aspects and embodiments of the present disclosure relate to systems and methods for water treatment. In particular, aspects and embodiments of the present disclosure relate to systems and methods for removing selenium from wastewater.

BACKGROUND

Some sources of selenium contaminated water include, for example, oil refineries, flue gas desulfurization wastewater from power plants, mining industry wastewater, and ground water. Wastewater produced during many refining processes may contain oil and grease, suspended solids, hydrogen sulfide, ammonia, chlorides, mercaptans, and phenols, as well as heavy metal contaminants, for example, selenium, among other contaminants. Such wastewater is often referred to as "sour water." Sour water is often treated in sour water strippers to remove undesirable contaminants prior to the treated sour water being reused in a refinery, sent to a wastewater system, or released to the environment. Wastewater generated by a sour water stripper may include undesirably high levels of selenium compounds. The concentration of selenium in sour water stripper wastewater may vary based on factors such as the amount of selenium in crude oil processed at an associated refinery and how the refinery operates. Typical levels of selenium in sour water stripper wastewater may vary from about 200 ppb to about 1,000 ppb.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labelled in every drawing. In the drawings.

SUMMARY

In accordance with an aspect disclosed herein, there is provided a system for the removal of selenium from sour water stripper wastewater. The system comprises a fluidized bed reactor including a reactor body, a mixer disposed in a lower portion of the reactor body, a reaction zone defined about the mixer, and an air supply configured to inject air directly into the reaction zone. The system may include a plurality of fluidized bed reactors fluidly connected in series.

In some embodiments, the reaction zone is located in a lower portion of the fluidized bed reactor. The fluidized bed reactor may further comprise a chimney disposed within the reactor body. The reaction zone may be defined below the chimney.

In some embodiments, the fluidized bed reactor includes zero-valent iron media. The zero-valent iron media may be coated with an iron oxide, for example, magnetite.

In some embodiments, the system further comprises a source of $Fe^{2+}$ ions in fluid communication with fluidized bed reactor.

In some embodiments, the system further comprises a source of a pH adjustment agent in fluid communication with fluidized bed reactor.

In some embodiments, the system further comprises an aeration basin in fluid communication downstream of the fluidized bed reactor. The system may further comprise a source of pH adjuster in fluid communication with the aeration basin. The system may further comprise a solids/liquid separator in fluid communication downstream of the aeration basin. The solids/liquid separator may be configured to produce a supernatant and settled sludge and to direct at least a portion of the settled sludge into the fluidized bed reactor.

In some embodiments, the system further comprises an equalization vessel in fluid communication upstream of the fluidized bed reactor. The equalization vessel may include a sour water stripper wastewater inlet in fluid communication with a source of sour water stripper wastewater. The system may further comprise a source of pH adjuster in fluid communication with the equalization vessel. The system may further comprise a source of oxidizer in fluid communication with the equalization vessel.

In some embodiments, the system further comprises an oxidation vessel in fluid communication downstream of the fluidized bed reactor.

In some embodiments, the system further comprises a flocculation vessel in fluid communication downstream of the fluidized bed reactor.

In some embodiments, the air supply is configured to inject the air into the reaction zone above the mixer.

In some embodiments, the air supply is configured to inject the air into the reaction zone below the mixer.

In some embodiments, the air supply is configured to inject the air into the reaction zone at substantially a same depth as the mixer.

In accordance with another aspect, there is disclosed a method of removing heavy metals from wastewater. The method comprises directing the wastewater into a fluidized bed reactor including a zero-valent iron media, mechanically mixing the wastewater in the fluidized bed reactor with a mixer to contact contaminants in the wastewater with the zero-valent iron media, and injecting an oxygen containing gas into a reaction zone defined about the mixer.

In some embodiments, injecting the oxygen containing gas into the reaction zone includes injecting the oxygen containing gas into a lower portion of the fluidized bed reactor. In some embodiments, the wastewater includes selenium and the method includes removing approximately 75% or more of the selenium from the wastewater in a single pass through a system including the fluidized bed reactor. The method may include removing approximately 99% or more of the selenium from the wastewater in a single pass through a system including the fluidized bed reactor. The method may include reducing a concentration of selenium in the wastewater to below 50 ppb in a single pass through a system including the fluidized bed reactor. The method may include reducing a concentration of selenium in the wastewater from above about 400 ppb to below about 5 ppb in a single pass through a system including the fluidized bed reactor.

In some embodiments, directing the wastewater into the fluidized bed reactor including the zero valent iron media includes directing the wastewater into a fluidized bed reactor including zero valent iron media coated with magnetite. The method may further comprise adding a source of $Fe^{2+}$ ions into the fluidized bed reactor. The source of $Fe^{2+}$ ions may be added to the fluidized bed reactor at a flow rate that maintains the concentration of $Fe^{2+}$ ions in the wastewater coming into contact with the zero-valent iron media in a range of between about 5 mg/L and about 50 mg/L. The source of $Fe^{2+}$ ions may be added to the fluidized bed reactor at a flow rate that maintains the concentration of $Fe^{2+}$ ions in the wastewater coming into contact with the zero-valent iron media in a range of between about 0 mg/L and about 5 mg/L.

In some embodiments, a pH adjustment agent is added to the fluidized bed reactor at a flow rate that maintains a pH of wastewater in the fluidized bed reactor between about 6.0 and about 8.0.

In some embodiments, the method further comprises contacting the wastewater with an oxidizer prior to introducing the wastewater into the fluidized bed reactor.

In accordance with another aspect, there is provided a method of increasing the selenium removal efficiency of a fluidized bed reactor including a zero valent iron media. The method comprises relocating a site of injection of an oxygen containing gas from a location proximate a top of the fluidized bed reactor to a location in a reaction zone defined about a mixer in a lower portion of the fluidized bed reactor.

DETAILED DESCRIPTION

This disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Embodiments of the present disclosure may be used for various purposes. For example, some embodiments of the present disclosure may be used for the remediation of industrial wastewater for its discharge at acceptable environmental levels, while other embodiments may be used to remove contaminants from wastewater or from ground water to produce potable or drinkable water. Other embodiments may be used in polishing operations for high purity water purification systems, and other embodiments may be used to produce high purity water for laboratory use. Embodiments of the present disclosure may use various forms of filtration media to accomplish the goals associated with the purpose for which the embodiments are intended. Some examples of media that may be used in different embodiments of the present disclosure include granular ferric oxide (GFH) media, activated carbon, ion-exchange resin, zero-valent iron, bio-active media comprising bacterial agents, and any other filtration media or resin. The media may comprise particles with substantially regular shapes (e.g., spheres), irregular shapes, or a mixture of both.

In particular embodiments, systems and methods disclosed herein may be used for the removal of contaminants such as but not limited to arsenic, aluminum, antimony, beryllium, mercury, selenium, cobalt, lead, cadmium, chromium, silver, zinc, nickel, molybdenum, thallium, vanadium, and ions thereof, borates, nitrates, bromates, iodates, and periodates, trichloroethylene, dissolved silica, and combinations thereof. In some embodiments, heavy metal contaminants, for example, selenium or other oxyanions may be removed from sour water stripper wastewater.

The primary species of selenium in wastewater from oil refinery sour water strippers is selenocyanate, $Se(CN)^{1-}$, in which the oxidation state of selenium is (−2), the most reduced state possible for selenium. It is not possible to remove significant amounts of selenium in this reduced oxidation state using known technologies such as iron co-precipitation, carbon adsorption, controlled oxidation, biological processes, or by contact with zero-valent iron. Aspects and embodiments disclosed herein include systems and methods that quickly and efficiently remove selenocyanate from sour water stripper wastewater which is generated, for example, during an oil refining process. The selenium is removed primarily for the purpose of wastewater treatment and discharge of the treated wastewater; however, a secondary purpose may be to concentrate selenium into a small volume of solids for the potential of selenium recovery and reuse. In some embodiments, systems and methods disclosed herein may reduce a selenium concentration in wastewater to below about 50 ppb (the maximum contaminant level goal for drinking water set in the 1974 U.S. Safe Drinking Water Act). In some embodiments, systems and methods disclosed herein may reduce selenium concentration in wastewater to below about 5 ppb (the upper limit for wastewater discharge set forth in the U.S. Clean Water Act, passed in 1972 and amended in 1977 and 1987) or even to 1 ppb or less. In some embodiments, systems and methods disclosed herein may reduce a selenium concentration in wastewater by approximately 75% or more, for example, by approximately 99% or more.

In some embodiments, selenium and/or other heavy metal contaminants are removed from sour water stripper wastewater using media comprising zero-valent iron (hereinafter Fe(0) or "ZVI"). The media may be provided as small particles or as a powder. In some embodiments, the ZVI powder may have an average particle size of less than about 100 μm, for example, less than about 90 μm or less than about 45 μm. The ZVI media particles may, in some embodiments, be coated to enhance the contaminant removal efficiency of the media. As used herein, the term "coated" may include "having an outer layer at least partially covered with," or "having an outer layer chemically or electrochemically converted to include." The ZVI media particles may be coated with an electrically conductive material. In some embodiments, it has been found beneficial to coat the ZVI particles with an iron-containing material, for example, one or more iron oxides. The ZVI media particles may, in some embodiments, be coated with a layer of magnetite. In some embodiments one or more electrically conductive forms of iron oxide other than magnetite, for example, maghemite, may additionally or alternatively be coated on a portion of the ZVI media particles and/or may be present in the media in addition to the magnetite coated ZVI particles.

In some embodiments, a layer of magnetite is coated on to the ZVI particles by chemically or electrochemically converting the outer layer of the ZVI particles as a conditioning step to maintain the activity of the ZVI during the process of treating wastewater. The removal of contaminants, for example, selenium from wastewater may include the reduction of the high oxidation state of the selenium (+6, +4, etc.) to insoluble elemental selenium by the ZVI. The elemental selenium (or other contaminant) may then be adsorbed to the ZVI media. The reduction of selenium and other contaminant elements may involve electron transfer from the ZVI to the target element. Without being bound to a particular theory, an example of a reduction reaction of, for example, selenium may occur according to the following reaction:

$$SeO_4^{2-} + 2Fe(0) + Fe^{2+} \rightarrow Se(0) + Fe_3O_4$$

Over time, the conversion of the ZVI to iron oxides and/or the accumulation of contaminants adsorbed on the surface of the media particles may render the media less effective at removing contaminants from wastewater than fresh media. In some embodiments, the concentration of one or more contaminants in treated water exiting a treatment system may be monitored and when this concentration exceeds a desired level, the media may be replaced with fresh media. In other embodiments, at least a portion of the media may be periodically or continuously replenished.

The magnetite layer (and/or another form of iron oxide) is coated on the ZVI particles to facilitate electron transfer from the ZVI to the target contaminant element(s). Magnetite, with a small band gap between the valence and the conductance band, is a good electron carrier and therefore facilitates the reduction of the target element by electron transfer from ZVI to the contaminant(s). The magnetite layer coated on the ZVI may also passivate the ZVI and facilitate prevention of oxidation of the ZVI. The magnetite coating may in some embodiments be very thin, for example, in a range of from about a monolayer to about a micron in thickness.

In some embodiments where ZVI is used as a contaminant removal media, wastewater to be treated may be dosed with chemicals to increase a concentration of $Fe^{2+}$ ions in the wastewater prior to, or during contact of the wastewater with the ZVI media. The $Fe^{2+}$ ions may facilitate maintaining the ZVI media in an active magnetite state and prevent substantial oxidation of the ZVI media to inactive oxides. Without being bound to any particular theory, an example of a reaction between the $Fe^{2+}$ and the ZVI media may include the following reaction:

$$2\gamma\text{-}FeOOH + Fe^{2+} \rightarrow Fe_3O_4 + 2H^+$$

The $Fe^{2+}$ ions may be introduced in the form of $FeCl_2$ or $FeSO_4$ stock solutions or other $Fe^{2+}$ salt at a set flow rate to maintain the concentration of $Fe^{2+}$ ions in the wastewater coming into contact with the ZVI media in a range of, for example, between about 5 mg/L to about 50 mg/L. In some embodiments where the wastewater is contaminated with Ni which is to be removed, lower $Fe^{2+}$ dosages may be utilized, for example, dosages sufficient to maintain the concentration of $Fe^{2+}$ ions in the wastewater coming into contact with the ZVI media in a range of, for example, between about 0 mg/L to about 5 mg/L. The desired concentration of $Fe^{2+}$ may be dependent upon the concentration and type of contaminants in the wastewater which are desired to be removed. If more than a desired amount of $Fe^{2+}$, for example, more than is needed to reduce a desired amount of the contaminant ions and maintain the ZVI in an active state, is added to the wastewater to be treated excess $Fe^{2+}$ in the wastewater, from dosage as well from in situ generation, will exit the media bed. In some embodiments the effluent of a fluidized bed reactor including the ZVI media may be monitored for the soluble iron levels and the dosage of $Fe^{2+}$ may be adjusted until the concentration of soluble iron in the effluent drops below a desired threshold level.

In some aspects and embodiments disclosed herein, a hybrid ZVI media technology may be used to remove reduced species of selenium, for example, selenocyanate, from sour water stripper wastewater in a reactor without the need for preoxidation outside the reactor to convert the selenocyanate to an oxidized form of selenium that can be removed by conventional selenium treatment processes such as iron coprecipitation, biological treatment, or traditional ZVI. In at least some embodiments, the need for pretreatment and/or post-treatment may be minimized or eliminated.

In accordance with one or more embodiments, the media may be present in a fluidized bed of a reactor and wastewater to be treated may be brought into contact with the fluidized bed. In some embodiments discussed herein, air may be injected into the heart of a reaction zone of an activated iron process reactor. Without wishing to be bound by any particular theory, the air may catalyze a complex set of chemical reactions to convert selenium, such as selenocyanate, to one or more species amenable to reaction by the reactive iron media process for removal from the wastewater stream. The air may impact both the selenium in the wastewater as well as the media in the reactor to catalyze treatment in accordance with various embodiments. The conversion of selenocyanate to elemental selenium with ZVI may be catalyzed by the presence of oxygen in wastewater including the selenocyanate. Oxygen (present as dissolved oxygen or as bubbles in the wastewater) may adsorb onto the ZVI/Iron Oxide media surface. Selenate also adsorbs onto the media surface. The oxygen may react with selenocyanate to form an intermediate oxygen/selenocyanate compound from which the selenium is converted to zero valent selenium, Se(0). It is believed that iron oxide on the surface of the ZVI media acts as a catalyst for this reaction. The end products are more iron oxides, which perpetuate the reaction, and Se(0) which is incorporated into the media and removed from the wastewater.

The selenium may be removed primarily for the purpose of wastewater treatment and discharge. The selenium may also be concentrated for potential recovery and reuse.

Figure 1:
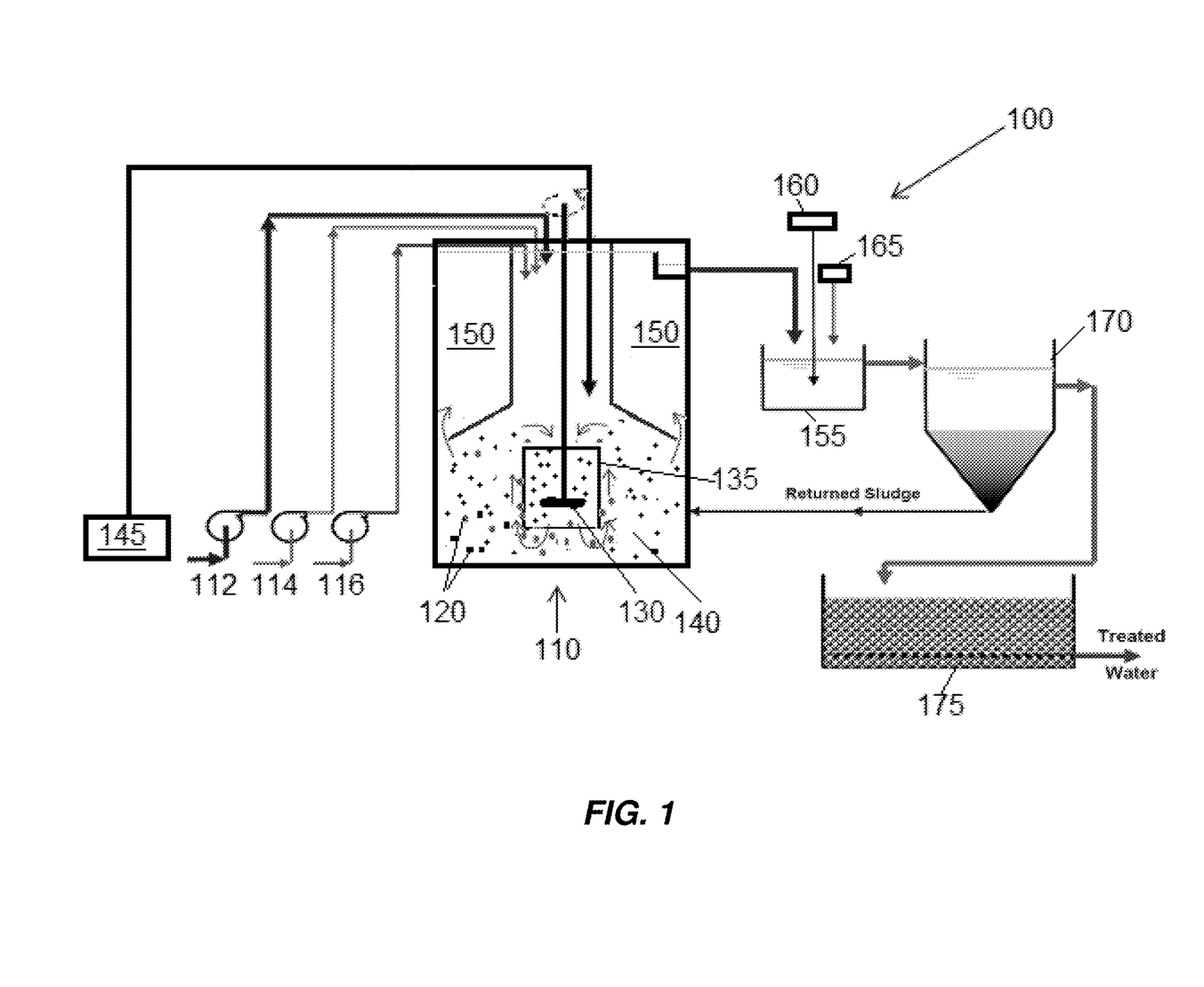
FIG. 1 is a schematic diagram of a sour water stripper wastewater treatment system in accordance with one or more embodiments.

An embodiment of a system for the treatment of sour water is illustrated generally at 100 in FIG. 1. The system 100 includes a fluidized bed reactor 110. Wastewater is supplied to the fluidized bed reactor 110 through a first pump 112. Other reagents, for example, $Fe^{2+}$ and HCl may be supplied to the fluidized bed reactor through second and third pumps 114, 116, respectively. As described above, the $Fe^{2+}$ may facilitate maintaining ZVI media 120 in the fluidized bed reactor 110 in an active magnetite state and prevent substantial oxidation of the ZVI media to inactive oxides. The HCl may be used to maintain the pH of fluid in the fluidized bed reactor 110 at a level which facilitates the reduction of selenium compounds such as selenocyanite, selenite, and selenate into elemental selenium. The pH level in the fluidized bed reactor may be maintained at a level of, for example, between about 6.0 and about 8.0.

A stirrer or mixer 130 in a flow conduit 135 of the fluidized bed reactor 110 may circulate liquid through the fluidized bed reactor 110 to facilitate mixing and contact of contaminants in the sour water undergoing treatment with the media 120 in the fluidized bed reactor 110. The stirrer 130 also facilities maintaining the media 120 suspended in fluid in the fluidized bed reactor 110, for example, in a fluidized zone 140 of the fluidized bed reactor 110.

An oxygen containing gas, for example, air or pure oxygen is provided from a source of gas or air 145, for example, a compressor, blower, or other device capable of pressurizing air into the fluidized bed reactor 110. The air may be strategically provided as discussed herein. In some embodiments, the air may be injected into the fluidized bed reactor 110 at various depths beneath a surface of the fluid in the fluidized bed reactor 110. In at least some preferred embodiments, the air may be injected deep within the reaction zone of the reactor. Oxygen in the air may facilitate oxidation of selenocyanate in the sour water stripper wastewater into selenite and/or selenate which is then reduced into elemental selenium when contacted with the ZVI media 120.

Suspended solids in the sour water stripper wastewater undergoing treatment are removed from the fluidized bed reactor 110 in an internal settling zone 150 and then transferred to an aeration basin 155 supplied with air from a source of air 160, where the solids may be aerobically treated to remove residual dissolved iron from the process. Fluid in the aeration basin 155 may be pH adjusted by the addition of a base, for example, NaOH from a source of NaOH 165. Mixed liquor generated in the aeration basin undergoes solids/liquid separation in a settling tank or clarifier 170. A low solids effluent from the settling tank or clarifier 170 is discharged as treated water after optionally passing through a final filter, for example, a sand filtration bed 175. High solids sludge is returned from the settling tank or clarifier 170 to the fluidized bed reactor 110 for use in capturing additional suspended or dissolved solids from sour water stripper wastewater undergoing treatment in the fluidized bed reactor 110.

Figure 2:
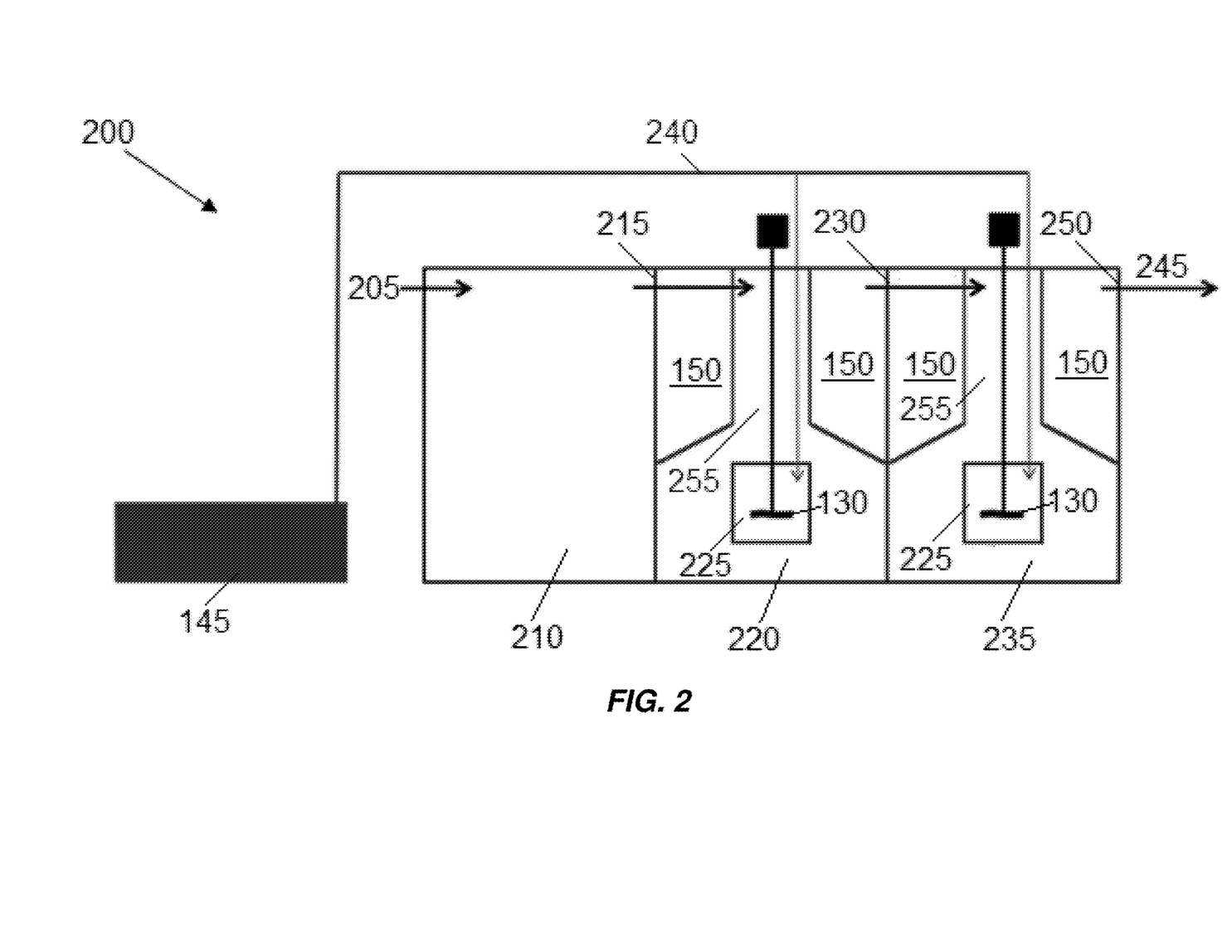
FIG. 2 is a schematic diagram of a sour water stripper wastewater treatment system in accordance with one or more embodiments.

Another embodiment of the system 100 is illustrated schematically in FIG. 2, generally at 200. In the system 200, wastewater 205, for example, sour water stripper wastewater including one or more undesirable components is introduced into an equalization vessel 210. A pump such as pump 112 of system 100 may be used to flow the wastewater 205 into the equalization vessel 210. In the equalization vessel 210 the wastewater 205 is mixed and one or more additives, for example, a pH adjustment agent may be added to the wastewater 205. The pH adjustment agent may be a base, for example, sodium hydroxide or an acid, for example, hydrochloric acid.

The mixed wastewater overflows the equalization vessel 210, for example, over a weir 215 into a first reactor 220. The first reactor 220 is in some embodiments substantially similar to the fluidized bed reactor 110 of the system 100. In at least some embodiments, air is injected deep beneath the surface of liquid in the first reactor 220 into a lower portion of the first reactor 220 and into or proximate a reaction zone 225 of the first reactor. The reaction zone 225 is, in some embodiments, located about a stirrer 130 in the first reactor. Surprisingly, it has been found that by changing the depth or location at which air is injected into the first reactor 220 (and/or the second reactor 235) such that it is introduced directly into the reaction zone, the selenium removal efficiency of the system 200 is significantly increased. Without being bound by a particular theory, it is believed that injecting the oxygen containing air directly into the reaction zone 225 instead of into an upper portion of the reactor 220 and/or 235 facilitates the transport of oxygen to the ZVI media prior to the oxygen reacting with other compounds in the wastewater, for example, $Fe^{2+}$. Although the air supply is illustrated in FIG. 2 as introducing air into the reaction zones 225 of the reactors 220, 235, above the mixers 130, in different embodiments, air may be injected below or at a substantially same or the same depth as the mixers 130.

The first reactor 220 is, in some embodiments, configured differently than the fluidized bed reactor 110. For example, the flow conduit 135 may be omitted from embodiments of the first reactor 220.

Solids settled in a settling zone 150 of the first reactor 220 overflow the first reactor 220, for example, over a weir 230 into a second reactor 235. The second reactor 235 may be substantially the same as the first reactor 220. Air is supplied to both the first reactor 220 and the second reactor 235 from a source of air 145 through an air header 240. In both reactors, the air may be injected into the reaction zones 225 below a stack or chimney 255 disposed in the reactor body rather than at a higher level such as in the stack or chimney 255. Effluent 245 overflows the second reactor 235, for example over a weir 250 formed in a settling zone 150 of the second reactor 235. The effluent of the second reactor 235 is sent on for further treatment and disposal.

The amount of air introduced to the heart of the reaction zone may be sufficient to catalyze the involved reactions but not too much so as to undesirably consume the media. The amount of air may depend on various factors such as the size of the reactor, amount of media, and one or more parameters of the wastewater to be treated such as its volumetric flow rate and concentration of undesirable species, including selenium. The air can be introduced at various flow rates, periodically or continuously. Other oxygen containing gasses, for example, pure oxygen may be substituted for the air.

It should be understood that systems in accordance with the present disclosure are not limited to the number of reactors illustrated in FIGS. 1 and 2. Some systems may include a single reactor, while other system may include a plurality of reactors, for example, three, four or more reactors operating in series and/or parallel.

EXAMPLES

Figure 3:
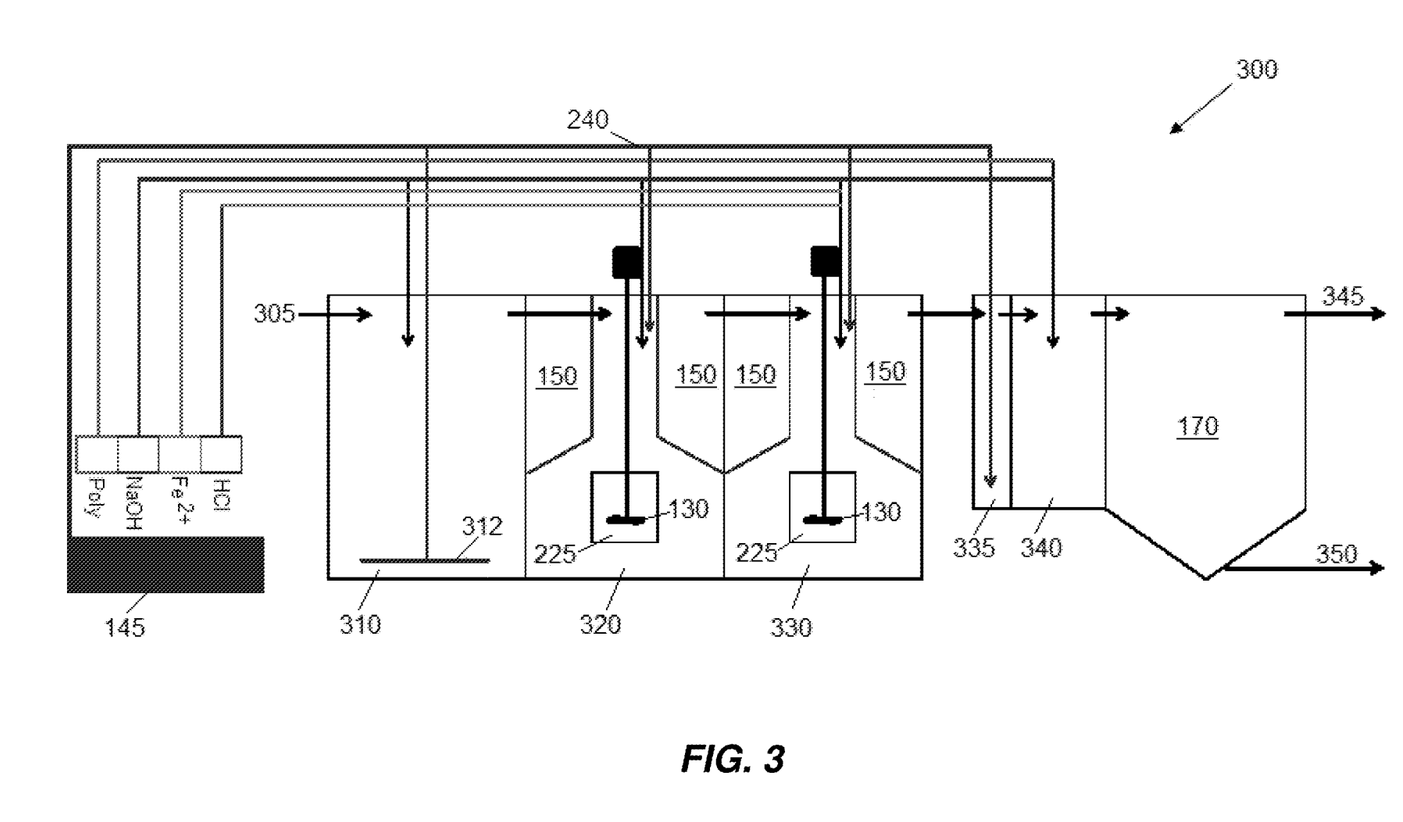
FIG. 3 is a schematic diagram of a sour water stripper wastewater treatment system in accordance with one or more embodiments.
Figure 4:
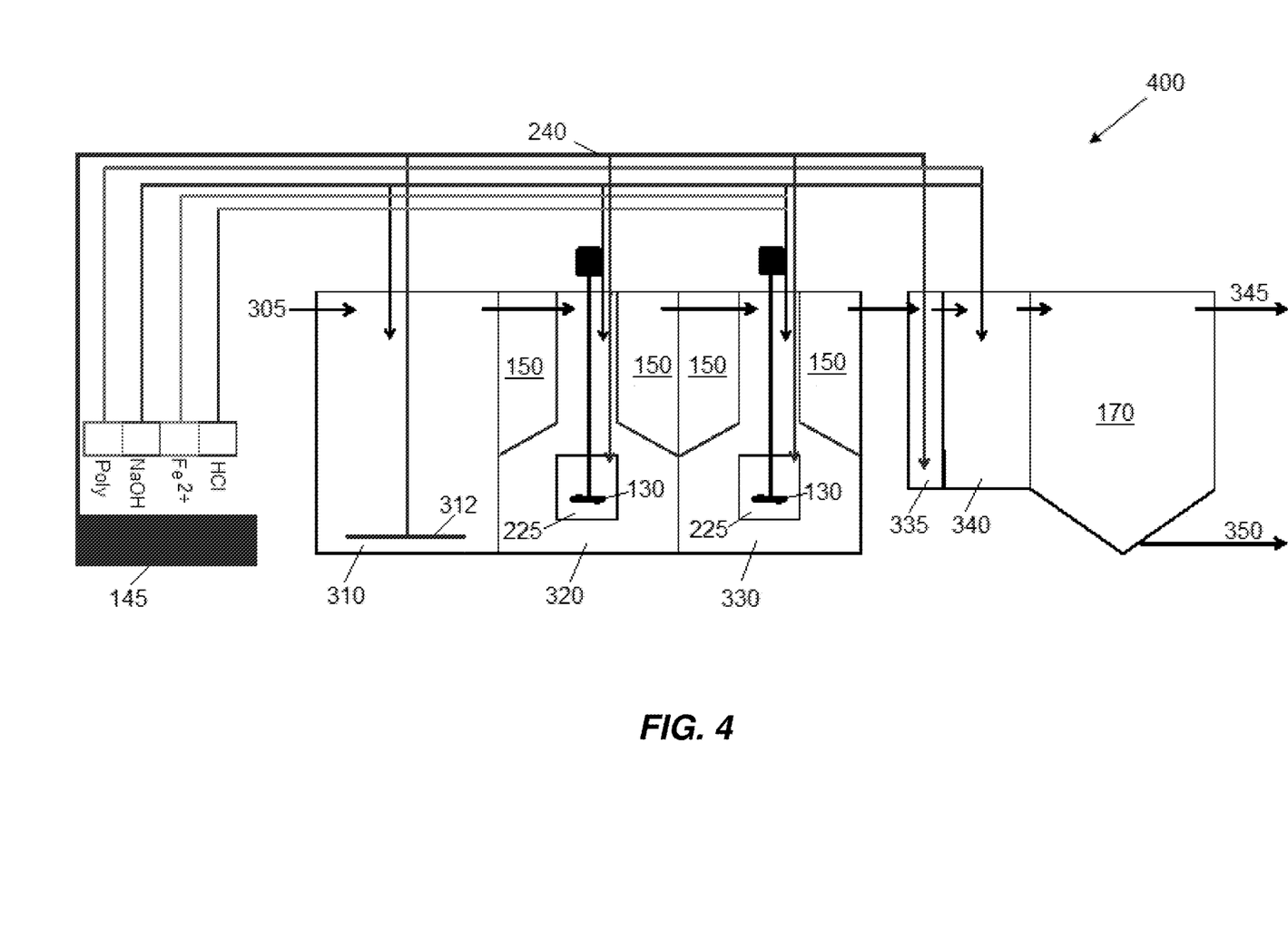
FIG. 4 is a schematic diagram of a sour water stripper wastewater treatment system in accordance with one or more embodiments.

Example 1: Comparison of Se Removal in Systems with Different Air Injection Points A first test wastewater treatment system 300 was configured as illustrated in FIG. 3. A second test wastewater treatment system 400 was configured as illustrated in FIG. 4. Each of the systems 300, 400 included an equalization vessel 310 into which selenocyanate containing sour water stripper wastewater 305 was introduced. The equalization vessels 310 each included a sparger 312 used to introduce gas to mix the wastewater 305 in the equalization vessels 310. The pH of the wastewater 305 was controlled by mixing hydrochloric acid or sodium hydroxide with the wastewater 305 in the equalization vessels 310 as needed.

The mixed wastewater overflowed the equalization vessels 310 into first reactors 320 of each of the systems 300, 400. In the first reactors 320 the wastewater was contacted with ZVI media to remove selenium. Liquid in the first reactors 320 was mixed with mechanical mixers 130. $Fe^{2+}$ was added to the first reactors 320 to maintain the activity of the ZVI media. The pH level in the first reactors 320 was controlled by adding hydrochloric acid or sodium hydroxide to the first reactors 320 as needed.

Partially treated wastewater overflowed settling zones 150 of the first reactors 320 into second reactors 330 of each of the systems 300, 400. In the second reactors 330 the wastewater was contacted with ZVI media to remove additional selenium. Liquid in the second reactors 330 was mixed with mechanical mixers 130. $Fe^{2+}$ was added to the second reactors 330 to maintain the activity of the ZVI media. The pH of in the second reactors 330 was controlled by adding hydrochloric acid or sodium hydroxide to the second reactors 330 as needed. Air was injected into each of the first reactors 320 and second reactors 330 of each of the systems 300, 400 at a rate of about 0.25 $ft^3$/min. Each of the first reactors 320 and second reactors 330 of each of the systems 300, 400 had volumes of about 1,500 gallons.

Further treated wastewater overflowed settling zones 150 of the second reactors 330 into oxidation vessels 335 and then flocculation vessels 340 of each of the systems 300, 400. Air was injected into the oxidation vessels to provide an aerobic environment for treatment of the further treated wastewaters in the oxidation vessels 335. A polymer flocculation aid and sodium hydroxide was added to the flocculation vessels 340 to facilitate flocculation of solids and produce a flocculated wastewater. The flocculated wastewater was introduced into a solids/liquid separator 170 which separated the flocculated wastewater into a solids lean effluent 345 and a solids rich sludge 350 which was disposed of subsequently.

The systems 300 and 400 were substantially the same. The primary difference between the two systems was that in system 300 air was injected into the first reactor 320 and second reactor 330 in the top three feet of the reactors, well above the reaction zones 225 about the mixers 130 in the reactors. In contrast, in the system 400 air was injected deeper into the reaction zones 225 about the mixers 130 in the reactors.

The systems 300 and 400 were operated as pilot treatment system to test the relative selenium removal efficiencies of the two systems. The systems were operated with a few minor differences in procedure as indicated below:

System 300 Operation (FIG. 5):
Day 1: Pilot startup.
Days 3-15: Inject air into the top three feet of the first reactor 320.
Days 4-33: Sparge air into equalization tank 310 at the most rapid rate possible to transfer oxygen into the wastewater. The initial oxidation reduction potential (ORP) of raw wastewater entering equalization tank 310 is approximately −500 mV, very chemically reducing.
Days 8-27: Add hydrogen peroxide into equalization tank 310 to pre-oxidize selenocyanate in wastewater to selenite/selenate forms amenable to treatment by reduction to elemental selenium. Maintain excess of 20-50 ppm of residual peroxide. Excursions of up to 100 ppm occurred on days 11/12.
Days 15-27: To catalyze the peroxide-selenocyanate reaction, inject a small amount of ferrous chloride into equalization tank 310.
Day 33: End pilot.

System 400 Operation (FIG. 6):
Day 1: Pilot startup.
Days 1-47: Air was injected into the reaction zones 225 of both reactors 320, 330 for this entire period. A fine-bubble diffuser was used to add air into the reaction zones 225.
Days 24-27: An excursion occurred resulting in unusually higher selenium in the wastewater sent to the pilot. Selenium was at least 1,420 ppb.
Media loss from the first reactor 320 caused an increase in selenium concentration in effluent from this reactor from Days 10-17 (See FIG. 6). Additions of media back into the reactor resulted in lower effluent selenium concentration. From about Day 36, further media additions were not made until Day 43 when a small amount was added to test recovery prior to pilot shut down.
Day 47: End pilot.

Results

Figure 5:
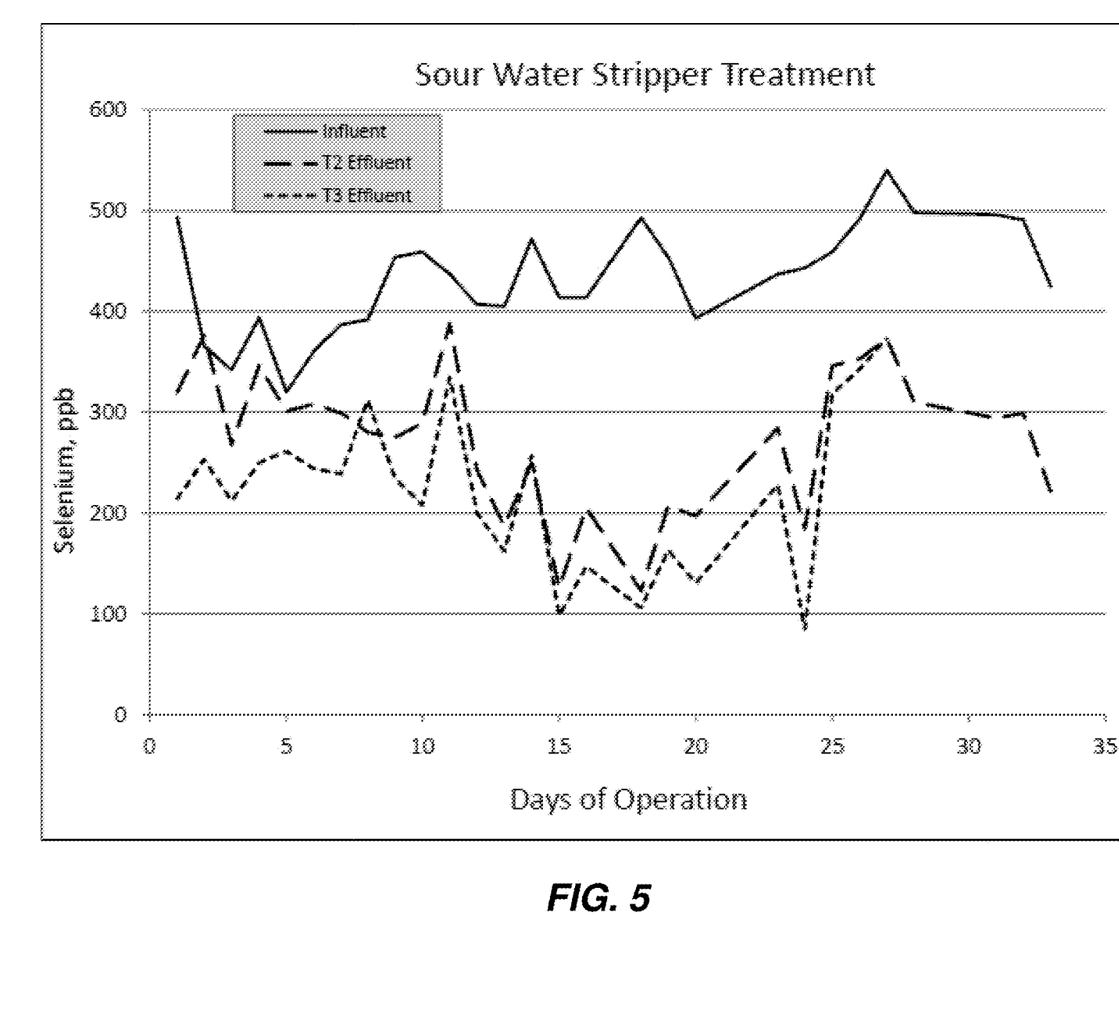
FIG. 5 illustrates results of a pilot for the removal of selenium from sour water stripper wastewater using a system as illustrated in FIG. 3 as discussed in Example 1.

The selenium removal efficiency of the systems 300 and 400 were compared. The selenium concentration in the influent wastewater 305 (influent), in fluid overflowing the first reactor 320 into second reactor 330 (T2 Effluent), and in fluid overflowing the first reactor 330 (T3 Effluent) is illustrated in FIG. 5 for system 300 and in FIG. 6 for system 400. The data for the testing of System 400 is illustrated in Table 1 below, with the data during the excursions in Days 10-17 and 24-27 and days after day 36 when no media was added not included.

TABLE 1

Selenium Removal Data

| Day | Selenium Conc, ppb Feed | T2 Effluent | T3 Effluent |
|---|---|---|---|
| 1 | 425 | 3.2 | 2.1 |
| 2 | 390 | 3.6 | 1.4 |
| 3 | 444 | 11.0 | 5.3 |
| 4 | 395 | 12.8 | 6.0 |
| 5 | 410 | 13.6 | 6.5 |
| 6 | 415 | 13.5 | 6.0 |
| 7 | 442 | 19.2 | 9.8 |
| 8 | 448 | 18.7 | 8.5 |
| 9 | 442 | 15.1 | 3.7 |
| 18 | 343 | 25.4 | 11.4 |
| 19 | 364 | 23.0 | 6.2 |
| 20 | 416 | 21.6 | 5.2 |
| 21 | 433 | 27.0 | 7.1 |
| 22 | 433 | 34.8 | 11.3 |
| 28 | 540 | 36.6 | 10.2 |
| 29 | 488 | 44.0 | 15.3 |
| 30 | 457 | 76.6 | 13.5 |
| 31 | 524 | 29.2 | 6.9 |
| 32 | 435 | 41.4 | 8.0 |
| 33 | 413 | 26.4 | 8.3 |
| 34 | 414 | 22.5 | 5.1 |
| 35 | 409 | 25.4 | 5.7 |
| 36 | 421 | 51.9 | 7.3 |

From this data it can be seen that the average concentration of selenium in the feed to system 400 was about 430 ppb for the days listed in Table 1. The average selenium concentration in the effluent from the first reactor was about 26 ppb and the average selenium concentration in the effluent from the second reactor was about 7 ppb, with a few points below 5 ppb. These results show that a two reactor system operated in accordance with the methods disclosed herein is capable of reducing levels of selenium in sour water stripper wastewater from over 400 ppb to less than 5 ppb in a single pass through the system.

Figure 6:
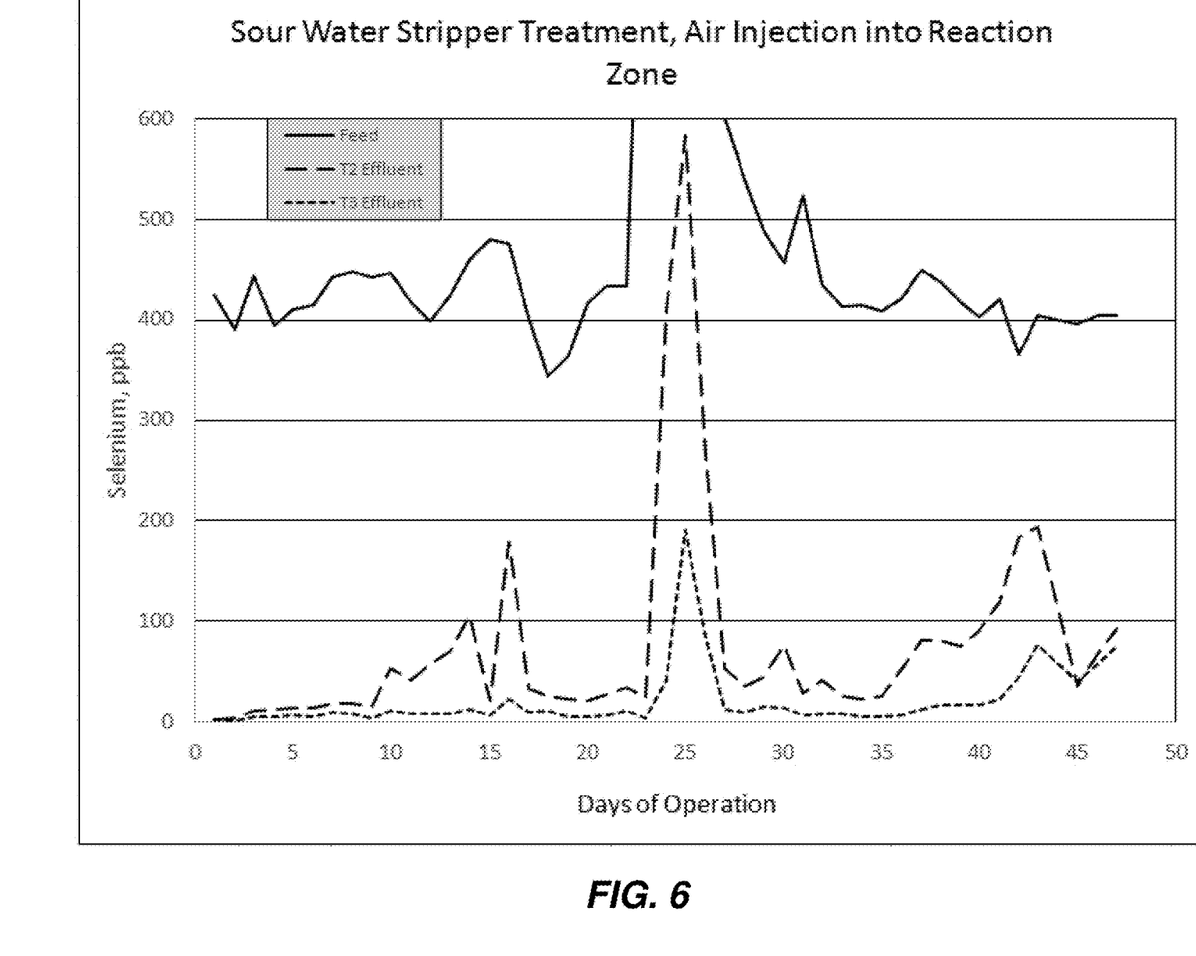
FIG. 6 illustrates results of a pilot for the removal of selenium from sour water stripper wastewater using a system as illustrated in FIG. 4 as discussed in accompanying Example 1.

It can be seen that selenium concentration in the influent wastewater to both systems 300 and 400 was between about 400 and about 500 ppb for the duration of the testing, except for an excursion in system 400 between Days 24 and 27. The selenium levels in the effluent from the second reactor of the system 300 ranged between about 100 ppb up to about 350 ppb during the course of the testing (FIG. 5). The selenium levels in the effluent from the second reactor of the system 400 remained well below 100 ppb during the course of the testing, except for during the excursion between Days 24 and 27 (FIG. 6). As discussed above, when data associated with the excursions in system 400 is removed, the average selenium level in the effluent from the second reactor of system 400 was about 7 ppb, a reduction of more than 10× in the selenium concentration as compared to that in the effluent of the second reactor of system 300. The selenium removal efficiencies in systems 300 and 400 were about (1−200/400)=50% and (1−7/400)=98.25%

These results show that the location of the point at which air is injected into a fluidized bed reactor including ZVI media has a significant effect on the selenium removal efficiency of the reactor. Injecting air into a lower portion of a reactor in the reaction zone of the reactor causes a significant increase in selenium removal efficiency as compared to similar reactor operating with air injected into an upper portion of the reactor. It was found surprising that relocating the point of injection of air into a wastewater treatment reactor could cause a reduction in the amount of residual selenium in effluent from the reactor by about 10×.

Figure 7:
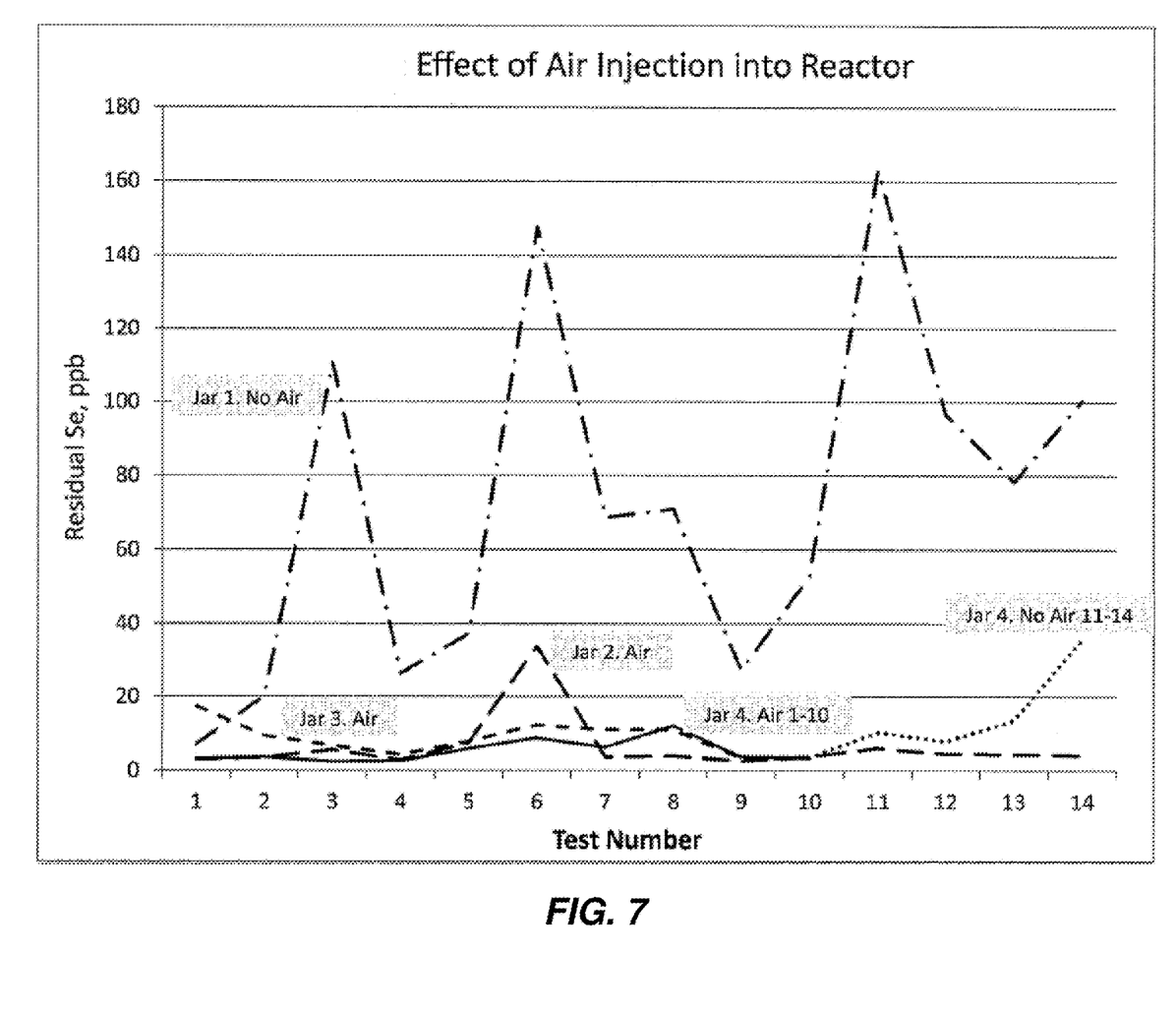
FIG. 7 illustrates results of a test of the removal of selenium from sour water stripper wastewater with iron media, with and without the introduction of air as discussed in Example 2.

Example 2: Comparison of Fresh, Used, and Reconditioned ZVI Media for Removal of Selenium from Wastewater Testing was performed to compare the selenium removal efficiency of fresh, used, and reconditioned ZVI media from sour water stripper wastewater (SWS). A first control jar was partially filled with fresh media and was not aerated over the course of the testing. A second jar was partially filled with fresh media and aerated over the course of the testing. A third jar was partially filled used media and aerated over the course of the testing. A fourth jar was partially filled with reconditioned media and aerated over the course of the testing. A series of tests was performed in accordance with the parameters indicated in Table 2 below. Results of the tests are illustrated in FIG. 7.

These results show that aeration of the jars resulted in a significant increase in selenium removal efficiency. Jar 1, which was not aerated, showed residual selenium levels of up to about 160 ppb, while the aerated jars showed residual selenium levels that stayed generally below about 20 ppb. Air injection to jar 4 was stopped for cycles 11-14, with less selenium removal observed as a result. The results also indicate that if a level of Fe in the jars was too low, selenium removal efficiency suffered—see, for example, the results of cycles 6 and 11 where low concentrations of Fe relative to the other cycles was utilized and the selenium removal efficiency of the various medias dropped.

These results also indicated that ZVI media may perform substantially the same for the removal of selenium from wastewater regardless of whether it is fresh, used, or reconditioned.

TABLE 2

Effect of Air Addition on Selenium Removal from Freshly Prepared, Used, and Reconditioned Media

| Test # | Reaction Time (min) | Jar 1 Control - No Air, Fresh Media Se (ppb) | Jar 1 Control - No Air, Fresh Media Fe (ppm) | Jar 2 - Air, Fresh Media Se (ppb) | Jar 2 - Air, Fresh Media Fe (ppm) | Jar 3 - Air, Used Media Se (ppb) | Jar 3 - Air, Used Media Fe (ppm) | Jar 4 - Air, Reconditioned Media Se (ppb) | Jar 4 - Air, Reconditioned Media Fe (ppm) |
|---|---|---|---|---|---|---|---|---|---|
| Untreated Selenium, 439.8 ppb | | | | | | | | | |
| 1 | 30 | 7.09 | 10.60 | 3.06 | 31.85 | 17.37 | 7.69 | 3.10 | 60.82 |
|   | 90 | 1.73 | 11.74 | 1.72 | 32.48 | 7.22 | 7.17 | 2.57 | 68.59 |
| 2 | 30 | 20.06 | 27.28 | 3.49 | 13.71 | 9.41 | 16.80 | 3.67 | 30.91 |
|   | 90 | 2.02 | 24.19 | 0.94 | 9.56 | 3.83 | 14.33 | 2.10 | 27.90 |
|   | 30 | 185.90 | 19.85 | 6.59 | 28.35 | 11.23 | 18.12 | 3.34 | 26.18 |
| 3 | 60 | 110.70 | 19.52 | 5.56 | 26.80 | 6.77 | 17.96 | 2.46 | 24.88 |
|   | 90 | 58.14 | 18.47 | 2.99 | 24.42 | 7.51 | 16.48 | 2.78 | 23.17 |
| 4 | 30 | 104.90 | 22.74 | 6.80 | 23.30 | 6.19 | 26.19 | 2.81 | 23.34 |
|   | 60 | 26.27 | 20.99 | 2.77 | 21.02 | 4.31 | 24.47 | 2.56 | 21.23 |
| Untreated Selenium, 484.6 ppb | | | | | | | | | |
| 5 | 60 | 37.25 | 33.26 | 7.49 | 9.90 | 7.84 | 18.59 | 5.86 | 9.04 |
| 6 | 60 | 147.61 | 0.34 | 33.65 | 0.05 | 12.30 | 0.06 | 8.78 | 0.03 |
| 7 | 60 | 68.78 | 12.58 | 3.63 | 15.32 | 115.80 | 13.06 | 6.25 | 7.45 |
| 8 | 60 | 70.92 | 22.97 | 3.98 | 16.96 | 11.02 | 15.68 | 12.08 | 15.71 |
| 9 | 60 | 27.15 | 49.56 | 2.55 | 31.28 | 3.35 | 25.68 | 3.73 | 21.29 |
| Untreated Selenium, 481.8 ppb | | | | | | | | | |
| 10 | 60 | 53.06 | 35.53 | 3.67 | 21.07 | 3.47 | 21.99 | 3.44 | 26.89 |
| Untreated Selenium, 436.6 ppb | | | | | | | | | Jar 4 - No Air |
| 11 | 60 | 163.20 | 0.34 | 6.03 | 0.24 | Jar 3 Not Tested | | 10.29 | 1.43 |
| 12 | 60 | 96.65 | 21.99 | 4.53 | 23.43 | | | 7.84 | 23.86 |
| 13 | 60 | 78.43 | 27.29 | 4.35 | 27.00 | | | 13.52 | 28.88 |
| 14 | 60 | 100.56 | 24.73 | 4.09 | 24.15 | | | 35.71 | 27.05 |

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

The invention claimed is:

1. A method of reducing the concentration of selenium species from a wastewater, the method comprising:
    directing a wastewater contaminated with selenium species comprising selenocyanate into a fluidized bed reactor comprising zero-valent iron media and a mixer, wherein the zero-valent iron media comprises zero-valent iron particles coated with an iron oxide and a source for $Fe^{2+}$ ions;
    mechanically mixing the wastewater in the fluidized bed reactor with the mixer to contact contaminants in the wastewater with the zero-valent iron media; and
    injecting an oxygen-containing gas into a reaction zone at substantially the same depth as the mixer to provide a treated wastewater having a reduced concentration of selenium species compared to the wastewater.

2. The method of claim 1, wherein the oxygen-containing gas is air.

3. The method of claim 1, wherein the method includes removing approximately 75% or more of the selenium species from the wastewater in a single pass through a system comprising the fluidized bed reactor.

4. The method of claim 1, wherein the method includes removing approximately 99% or more of the selenium species from the wastewater in a single pass through a system comprising the fluidized bed reactor.

5. The method of claim 1, wherein the method includes reducing a concentration of selenium species in the wastewater to below 50 ppb in a single pass through a system comprising the fluidized bed reactor.

6. The method of claim 1, wherein the zero-valent iron media comprises zero-valent iron particles coated with magnetite.

7. The method of claim 1, wherein the source of $Fe^{2+}$ ions is $FeCl_2$ or $FeSO_4$.

8. The method of claim 1, wherein the source of $Fe^{2+}$ ions is added at a flow rate that maintains the concentration of $Fe^{2+}$ ions in the wastewater coming into contact with the zero-valent iron media in a range of between about 5 mg/L and about 50 mg/L.

9. The method of claim 1, wherein the source of $Fe^{2+}$ ions is added at a flow rate that maintains the concentration of $Fe^{2+}$ ions in the wastewater coming into contact with the zero-valent iron media in a range of between about 0 mg/L and about 5 mg/L.

10. The method of claim 1, wherein a pH adjustment agent is added to the fluidized bed reactor at a flow rate that maintains a pH of the wastewater in the fluidized bed reactor between about 6.0 and about 8.0.

11. The method of claim 1, wherein further comprising contacting the wastewater with an oxidizer prior to introducing the wastewater into the fluidized bed reactor.

12. The method of claim 1, wherein the wastewater is sour water stripper wastewater.

13. The method of claim 1, wherein the selenium species is selenocyanate.

* * * * *